US012121119B2

(12) United States Patent
Koren et al.

(10) Patent No.: US 12,121,119 B2
(45) Date of Patent: Oct. 22, 2024

(54) WEARABLE ACCESSORY WITH INTEGRATED LIQUID CONTAINER

(71) Applicants: Daniel Koren, Miami, FL (US); Benjamin Samuel Koren, Rancho Mirage, CA (US)

(72) Inventors: Daniel Koren, Miami, FL (US); Benjamin Samuel Koren, Rancho Mirage, CA (US)

( * ) Notice: Subject to any disclaimer, the term of this patent is extended or adjusted under 35 U.S.C. 154(b) by 0 days.

(21) Appl. No.: 18/314,877

(22) Filed: May 10, 2023

(65) Prior Publication Data

US 2023/0276908 A1 Sep. 7, 2023

Related U.S. Application Data

(63) Continuation of application No. 17/811,069, filed on Jul. 6, 2022, now Pat. No. 11,659,900.

(60) Provisional application No. 63/218,630, filed on Jul. 6, 2021.

(51) Int. Cl.
*A44C 5/00* (2006.01)
*A45D 34/00* (2006.01)
*B05B 11/10* (2023.01)
*B05B 15/62* (2018.01)

(52) U.S. Cl.
CPC .............. *A44C 5/003* (2013.01); *A45D 34/00* (2013.01); *B05B 11/1001* (2023.01); *B05B 15/62* (2018.02); *A45D 2034/007* (2013.01); *A45D 2200/057* (2013.01)

(58) Field of Classification Search
CPC .. A44C 5/003; A45D 34/00; A45D 2034/007; A45D 2200/057; B05B 11/3001; B05B 15/62
See application file for complete search history.

(56) References Cited

U.S. PATENT DOCUMENTS 4,768,688 A * 9/1988 Harrigan ................ A45D 34/00 63/3
5,217,143 A * 6/1993 Aitken ................. A44C 15/002 206/823
5,924,601 A * 7/1999 Chen ......................... F41H 9/10 222/78
7,135,011 B2 * 11/2006 Powers .................. A45D 34/00 604/311

(Continued)

*Primary Examiner* — Vishal Pancholi
(74) *Attorney, Agent, or Firm* — Nolan IP Law; Jason M. Nolan

(57) ABSTRACT

A wearable accessory for storing and dispensing liquid and a method of using the same are provided. The accessory can include a housing having a loop structure with a through-hole configured to receive a hand of a user therethrough, and a liquid container enclosed within the housing. The through-hole can be sized for the user's lower arm. The liquid container can include a first end having a sealable opening for adding liquid for storing and dispensing, and a second end in fluid communication with a nozzle opening recessed in an external surface on the front side of the housing. The nozzle opening can be configured to receive and dispense a volume of atomized liquid from a sprayer coupled to the second end of the liquid container when the sprayer is activated by an actuator integrated into the housing. The recessed nozzle opening prevents the user from contacting the sprayer.

17 Claims, 6 Drawing Sheets

(56) References Cited

U.S. PATENT DOCUMENTS

| | | | | |
|---|---|---|---|---|
| 7,766,193 | B2 * | 8/2010 | Stollmann | A44C 5/003 224/219 |
| 9,347,749 | B2 * | 5/2016 | Olah | F41H 9/10 |
| 9,578,935 | B2 * | 2/2017 | Horgan | A45D 34/00 |
| D780,613 | S * | 3/2017 | Shaukat | D11/2 |
| 10,203,719 | B2 * | 2/2019 | Oliveira | G06F 1/1626 |
| 10,952,568 | B2 * | 3/2021 | Matthews | A45D 40/00 |
| 2011/0139823 | A1 * | 6/2011 | Staudt | A41D 20/00 222/175 |
| 2011/0155765 | A1 * | 6/2011 | Properzi | A47K 5/1201 222/401 |
| 2012/0138637 | A1 * | 6/2012 | Ciavarella | B05B 11/0027 224/148.4 |
| 2017/0156454 | A1 * | 6/2017 | Abadi | A44C 5/0053 |

* cited by examiner

WEARABLE ACCESSORY WITH INTEGRATED LIQUID CONTAINER

CROSS-REFERENCE TO RELATED APPLICATIONS

This is a continuation of U.S. patent application Ser. No. 17/811,069 filed on Jul. 6, 2022, the content of which is relied upon and incorporated herein by reference in its entirety, and the benefit of priority under 35 U.S.C. § 120 is hereby claimed. U.S. patent application Ser. No. 17/811,069 claims the benefit of priority under 35 U.S.C. § 119(e) of U.S. Provisional Application Ser. No. 63/218,630 filed on Jul. 6, 2021, the content of which is relied upon and incorporated herein by reference in its entirety.

FIELD

The present disclosure generally relates to an article of apparel, and more particularly to a wearable accessory (e.g., bracelet) comprising an integrated liquid container having a spraying mechanism for dispensing liquid out of the accessory.

BACKGROUND

Bracelets and other ornamental bands that are worn around a user's wrist are common accessories. Those who wear such accessories may not carry a bag or wear clothing that can accommodate a liquid dispenser (e.g., a bottle of hand sanitizer). For at least these reasons, there is a need for a device that can function as a wearable accessory and a liquid dispenser.

SUMMARY

In various embodiments, a wearable accessory for storing and dispensing liquid is provided. In some embodiments, the accessory comprises a wearable housing comprising a loop structure with a through-hole configured to receive a hand of a user therethrough, the through-hole being sized for the user's lower arm; and a liquid container enclosed within the housing, the liquid container comprising a first end having a sealable opening for adding liquid for the storing and dispensing, and a second end in fluid communication with a nozzle opening recessed in an external surface on the front side of the housing; wherein the nozzle opening is configured to receive and dispense a volume of atomized liquid from a sprayer coupled to the second end of the liquid container when the sprayer is activated by an actuator integrated into the housing; and wherein the recessed nozzle opening prevents the user from contacting the sprayer.

In some embodiments, the first end of the liquid container is concealed within the housing by a detachable cap cover that is removably attached to the housing.

In some embodiments, the liquid container further comprises a removable cap, and the opening on the first end of the liquid container is configured to be coupled to the removable cap.

In some embodiments, the liquid container comprises a shape adapted for the housing, whereby the liquid container is immobilized within the housing due to its positioning between a plurality of perimeter edges on the housing and the through-hole.

In some embodiments, the actuator comprises a block-like structure having an outward facing surface that is accessible to the user as a push button on a top surface of the accessory and an inward facing surface that slides toward and contacts the sprayer when the actuator is activated by a user.

In some embodiments, the actuator comprises a channel extending from an opening in a first actuator surface to an opening in an adjacent second actuator surface, wherein the channel is in fluid communication with the sprayer via the opening in the first actuator surface and in fluid communication with the nozzle opening recessed in the front side of the housing via the opening in the adjacent second actuator surface.

In some embodiments, the opening at the first end of the liquid container is concealed within the housing by a detachable cap cover that is removably attached to a rear side of the housing opposite the front side.

In some embodiments, the through-hole comprises a cylindrical shape having a circumference ranging from about 5.5 to about 10 inches, or from about 7 to about 9 inches.

In some embodiments, the wearable accessory further comprises a lock integrated into the housing, wherein the lock is slidable from a locked position to an unlocked position, and wherein the lock in the locked position prevents the actuator from activating the sprayer.

In various embodiments, a method of applying a fragrance to a surface is provided. In some embodiments, the method comprises the steps of providing a wearable accessory for storing and dispensing fragrance containing liquid, the accessory comprising: a wearable housing comprising a loop structure with a through-hole configured to receive a hand of a user therethrough, the through-hole being sized for the user's lower arm; and a liquid container enclosed within the housing, the liquid container comprising a first end having a sealable opening for adding liquid for the storing and dispensing, and a second end in fluid communication with a nozzle opening recessed in an external surface on the front side of the housing; wherein the nozzle opening is configured to receive and dispense a volume of atomized liquid from a sprayer coupled to the second end of the liquid container when the sprayer is activated by an actuator integrated into the housing; wherein the recessed nozzle opening prevents the user from contacting the sprayer; and wherein the liquid container is filled with a volume of a fragrance containing liquid; actuating the actuator of the accessory, whereby the actuating causes liquid inside of the liquid container to be drawn through a dip tube to an interior of a sprayer housing; and further actuating the actuator pumps the liquid upward through a piston toward the actuator before the liquid exits the nozzle opening.

In some embodiments, the surface is human skin.

In some embodiments, the first end of the liquid container is concealed within the housing by a detachable cap cover that is removably attached to the housing.

In some embodiments, the liquid container further comprises a removable cap, and the opening on the first end of the liquid container is configured to be coupled to the removable cap.

In some embodiments, the liquid container comprises a shape adapted for the housing, whereby the liquid container is immobilized within the housing due to its positioning between a plurality of perimeter edges on the housing and the through-hole.

In some embodiments, the actuator comprises a block-like structure having an outward facing surface that is accessible to the user as a push button on a top surface of the accessory and an inward facing surface that slides toward and contacts the sprayer when the actuator is activated by a user.

In some embodiments, the actuator comprises a channel extending from an opening in a first actuator surface to an opening in an adjacent second actuator surface, wherein the channel is in fluid communication with the sprayer via the opening in the first actuator surface and in fluid communication with the nozzle opening recessed in the front side of the housing via the opening in the adjacent second actuator surface.

In some embodiments, the opening at the first end of the liquid container is concealed within the housing by a detachable cap cover that is removably attached to a rear side of the housing opposite the front side.

In various embodiments, a method of sanitizing a surface is provided. In some embodiments, the method comprises the steps of providing a wearable accessory for storing and dispensing sanitizing liquid, the accessory comprising: a wearable housing comprising a loop structure with a through-hole configured to receive a hand of a user therethrough, the through-hole being sized for the user's lower arm; and a liquid container enclosed within the housing, the liquid container comprising a first end having a sealable opening for adding liquid for the storing and dispensing, and a second end in fluid communication with a nozzle opening recessed in an external surface on the front side of the housing; wherein the nozzle opening is configured to receive and dispense a volume of atomized liquid from a sprayer coupled to the second end of the liquid container when the sprayer is activated by an actuator integrated into the housing; wherein the recessed nozzle opening prevents the user from contacting the sprayer; and wherein the liquid container is filled with a volume of sanitizing liquid; actuating the actuator of the accessory, whereby the actuating causes liquid inside of the liquid container to be drawn through a dip tube to an interior of a sprayer housing; and further actuating the actuator pumps the liquid upward through a piston toward the actuator before the liquid exits the nozzle opening.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

Figure 1:
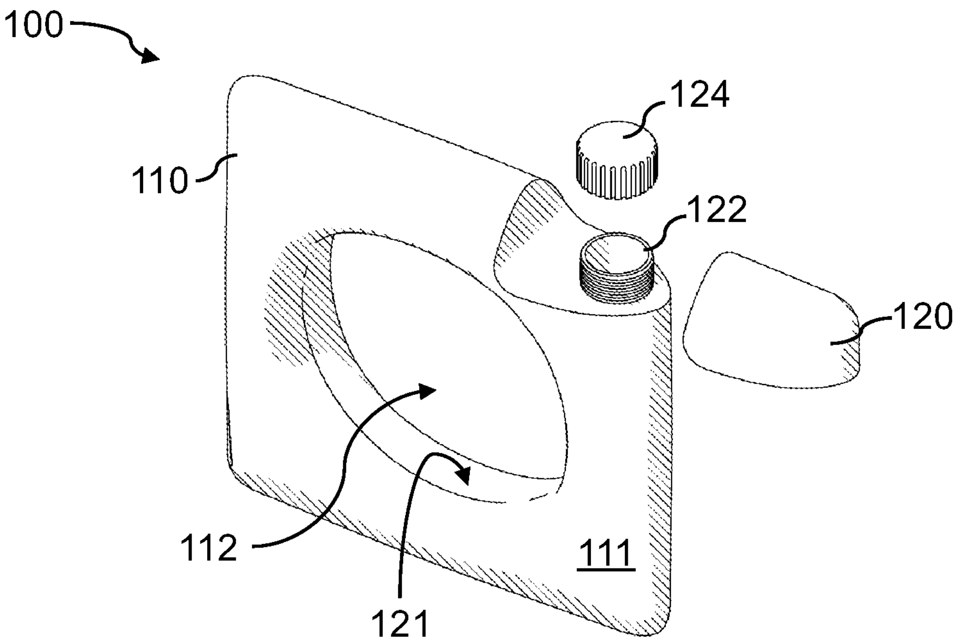
FIG. 1 is a rear perspective view of a wearable accessory, in accordance with some embodiments described herein.

The drawings are not necessarily to scale, and certain features and certain views of the drawings may be shown exaggerated in scale or in schematic in the interest of clarity and conciseness.

DETAILED DESCRIPTION

Reference will now be made in detail to the exemplary embodiment(s), examples of which is/are illustrated in the accompanying drawings. Whenever possible, the same reference characters will be used throughout the drawings to refer to the same or like parts.

Before describing the exemplary embodiments, it is noted the embodiments reside primarily in combinations of components and procedures related to the accessory. Accordingly, the accessory components have been represented where appropriate in the drawings, showing only those specific details that are pertinent to understanding the embodiments of the present disclosure so as not to obscure the disclosure with details that will be readily apparent to those of ordinary skill in the art having the benefit of the description herein.

The specific details of the various embodiments described herein are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

In various embodiments, as shown in FIGS. 1-13, a wearable accessory is provided. The wearable accessory is sized and configured to be worn by a user, including, for example, on the user's wrist or ankle. The wearable accessory is configured to house a container for containing liquid and a mechanism for atomizing and spraying the liquid out of the accessory in a controlled manner, in a predetermined amount, and in a predetermined direction.

Figure 2:
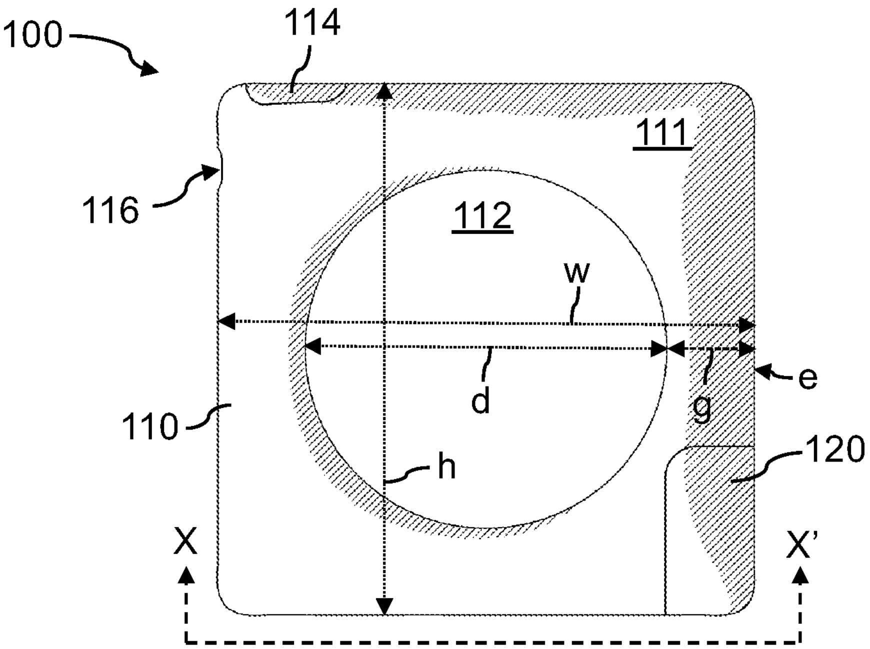
FIG. 2 is a side view of the wearable accessory of FIG. 1.

In some embodiments, as shown in FIGS. 1-6, 8, and 13, the accessory 100 is provided. In such embodiments, the accessory 100 comprises the housing 110. In some embodiments, the housing 110 comprises a three-dimensional structure comprising the first face 111, the second face 113 opposite the first face 111, and the through-hole 112 extending between the first face 111 to the second face 113. In some embodiments, the through-hole 112 is positioned in the center or center portion of the housing 110 to define a generally ring-like shape. In this context, the term "generally ring-like" includes circular and non-circular shapes forming a wearable loop or band with a through-hole in the center or center portion, as shown in FIG. 2. In some embodiments, the housing 110 forms a closed loop or band with no gaps in the generally ring-like structure. In some embodiments, the housing 110 forms an open loop or band structure having a circumferential gap in the generally ring-like structure. In some embodiments, the positioning of the through-hole 112 in the center or center portion of the housing 110 provides a symmetrical shape for the three-dimensional structure.

Figure 3:
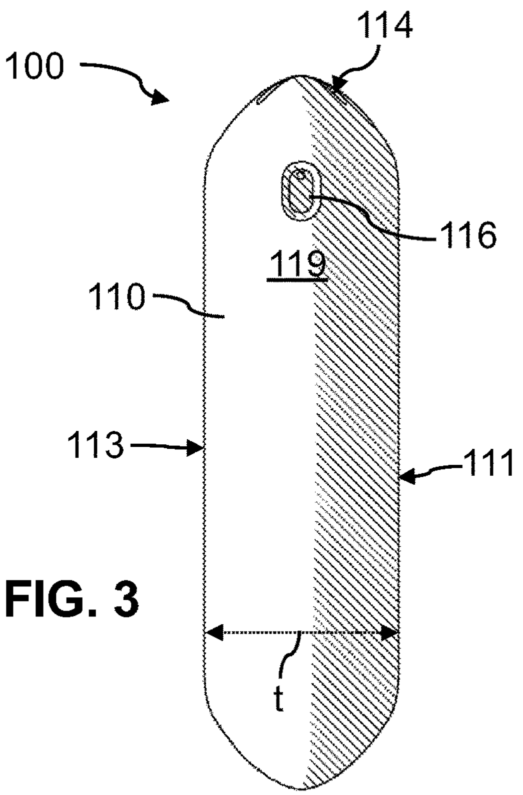
FIG. 3 is a front view of the wearable accessory of FIG. 1.

The accessory 100 can be any suitable size and shape. In this context, the suitability of the size and shape is based on the wearability of the accessory 100 for a user (i.e., human), and the term "wearability" refers to the comfort and overall profile of the accessory 100. Referring to FIGS. 2 and 3, the accessory 100 comprises a predetermined width (w), height (h), and thickness (t). As shown in FIG. 2, the distances between opposite edges of the accessory 100 define the width (w) and height (h), respectively. As shown in FIG. 3, the distance between the first face 111 and the second face 113 defines the thickness (t). In some embodiments, the width and height are the same. In other embodiments, the width and height are different. In various embodiments, the width (w) and height (h) range from about 2 to about 5 inches ("), including, e.g., 2.5", 2.75", 3", 3.25", 3.5", 3.75", 4", 4.25", 4.5", etc.

The through-hole 112 can be any suitable size and shape. In some embodiments, the through-hole 112 has a cylindrical shape with a circular cross-sectional profile, as shown in FIGS. 1-13. In such embodiments, the cylindrical shape provides a smooth interior surface 121 that facilitates the ability of the through-hole 112 to receive a body part of the user. In some embodiments, for example, the accessory 100 is a bracelet and the smooth interior surface 121 defining the through-hole 112 will facilitate the insertion of the user's hand through the through-hole 112, and further accommodate the user's wrist and lower arm (i.e., the portion of the arm extending between and including the elbow and the wrist) so the accessory 100 can be slidably adjusted up and down the user's arm. In some embodiments, shapes other than cylindrical are contemplated for the through-hole 112, including, for example, a generally cylindrical shape having beveled circumferential edges near the first and second faces 111, 113.

In some embodiments, the accessory 100 is a bracelet. Users generally have a wrist circumference (c) ranging from about 5 to about 9 inches ("), including, e.g., 5.5", 6", 6.5", 7", 7.5", 8", 8.5". In some embodiments, the through-hole 112 of the accessory 100 comprises a circumference (c) ranging from about 5.5 to about 10 inches, or between about 7 and about 9 inches, including, e.g., 6", 6.5", 7", 7.5", 8", 8.5", 9", 9.5", to accommodate the user's wrist. The stated ranges include any subranges thereof, as well as the intermediate points (e.g., 6.2", 6.29", 6.4", 6.79", 7.1", 7.29", 7.9", 8.29", 8.4", 8.79", 9.28". Each circumference (c) has a corresponding diameter (d). For example, a through-hole 112 having a circumference of 8.29" will have a corresponding diameter (d) of 2.625". One skilled in the art would appreciate how to calculate the corresponding diameter (d) for any circumference using the formula: $d=c/\pi$.

In some embodiments, as shown in FIG. 2, the accessory 100 comprises a spaced distance (g) between the through-hole 112 and the edge (e). In some embodiments, the spaced distance (g) ranges from about 0.25 to about 1.5 inches ("), including, e.g., 0.4375", 0.5", 0.5625", 0.6", 0.625", 0.6875", 0.7", 0.8", 0.9", 1.0" etc. In some embodiments, the spaced distance (g) between the through-hole 112 and the edge (e) is identical for the entire perimeter edge (e) of the accessory. In such embodiments, the accessory would have a tubular shape, such as accessory 300 in FIG. 9. In other embodiments, the spaced distance (g) between the through-hole 112 and the edge (e) is not identical for the entire perimeter surface of the accessory. In such embodiments, two or more different spaced distances (g) between the through-hole 112 and the edge (e) may be used to create various shapes, such as the accessories 100, 400, 500, and 600 in FIGS. 1 and 9-12, respectively.

Figure 4:
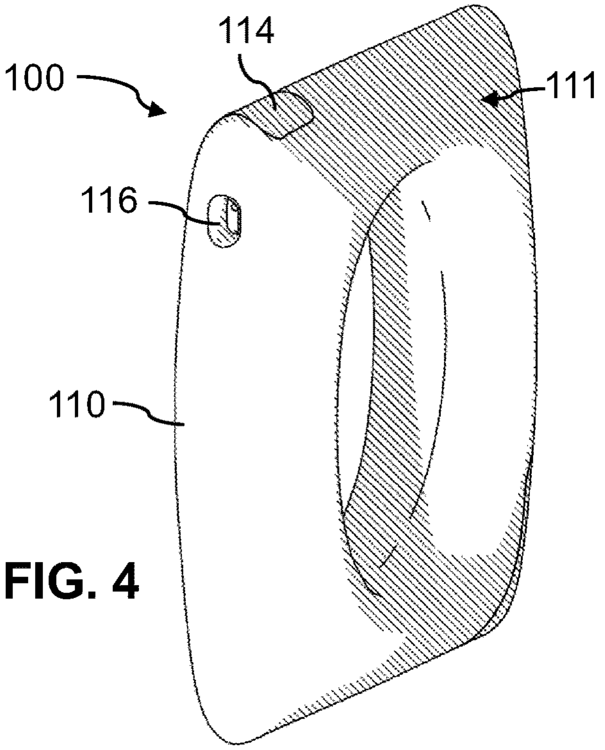
FIG. 4 is a front perspective view of the wearable accessory of FIG. 1.
Figure 5:
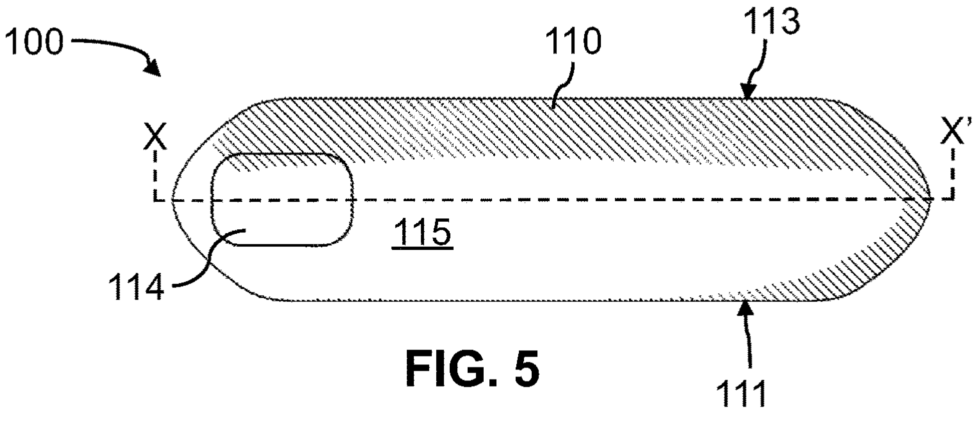
FIG. 5 is a top view of the wearable accessory of FIG. 1.
Figure 13:
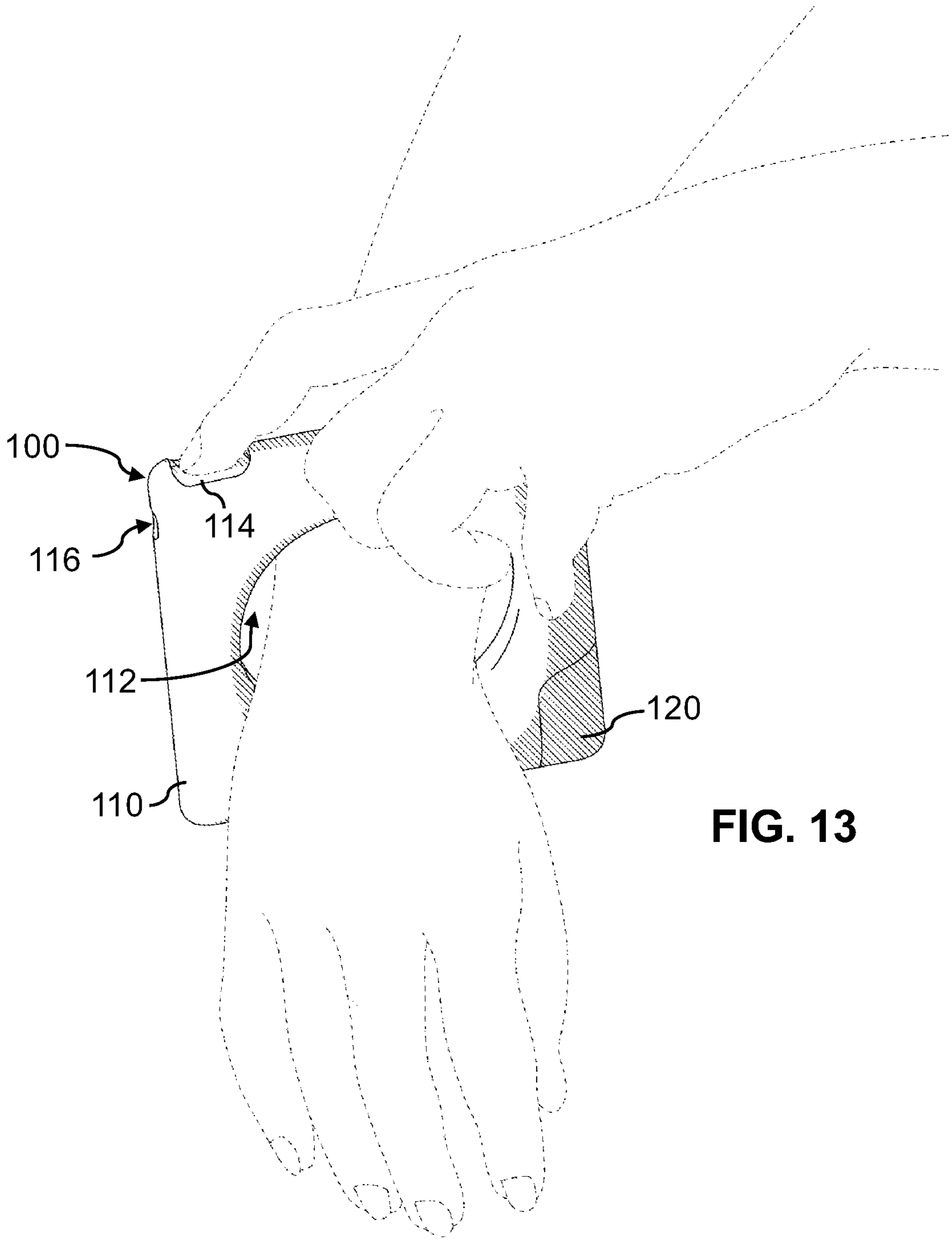
FIG. 13 is a perspective environmental view showing a user wearing and activating the wearable accessory of FIG. 1.

In some embodiments, the accessory 100 comprises one or more components integrated into the housing 110, including the detachable cap cover 120. In some embodiments, the detachable cap cover 120 is a shell having a size, shape, and overall profile that corresponds to the size, shape, and overall profile of the housing 110. In some embodiments, the cap cover 120 is removably coupled to the housing 110. In FIG. 1, for example, the cap cover 120 is detached from the accessory 100, whereas FIGS. 2, 4, and 13 show the cap cover 120 attached to the accessory 100 to conceal the removable cap 124 and the mouth 122. In such embodiments, the cap cover 120 has a size, shape, and overall profile that corresponds to the size, shape, and overall profile of the housing 110. In some embodiments, the cap cover 120 is slidably removable from the housing 100, whereby the cap cover 120 can be slid into position on the housing 100 to complete the overall structure of the accessory 100. In some embodiments, the cap cover 120 and the housing 100 make a clicking sound to indicate the cap cover 120 has been secured into its proper position. In some embodiments, the cap cover 120 can include one or more clips that can snap into one or more corresponding slots in the housing 110 to provide a reinforced closure. In some embodiments, the cap cover 120 can be pivotably attached to the housing 110 using a hinge. In such embodiments, the detachable cap cover 120 can be flipped open about the hinge to provide access to the removeable cap 124 and mouth 122 concealed within, while also keeping the detachable cap cover 120 coupled to the housing 110.

The detachable cap cover 120 can be positioned on the housing 110 of the accessory 100 in any suitable place. In some embodiments, the housing 110 has a shape with corners or points, and the cap cover 120 can be positioned on one of the corners/points. For example, the accessory 100 in FIG. 1 has a generally rectangular prism shape with four corners (and a square perimeter cross-sectional shape), and the cap cover 120 is positioned at and configured as one of the four corners. In some embodiments, the housing 110 comprises a shape having no corners or points, such as a circular ring structure. In such embodiments, the detachable cap cover 120 can be positioned on the housing 110 at the position corresponding to the location of the mouth 122 and removable cap 124. In such embodiments, the cap cover 120 can be snapped in and out of position as needed.

In some embodiments, the accessory 100 comprises the liquid container 126, which is integrated within the housing 110. In some embodiments, the housing 110 includes an interior, hollowed-out space for the liquid container 126. In some embodiments, the liquid container 126 is integrated into a filled interior space. In such embodiments, the liquid container 126 is sized and configured to correspond to the internal size, shape, and profile of the housing 110. In some embodiments, as shown in FIG. 6, for example, the liquid container 126 comprises a general elbow shape that extends along two perimeter edges of the housing 110 and the internal edge defined by the circumference of the through-hole 112.

Figure 6:
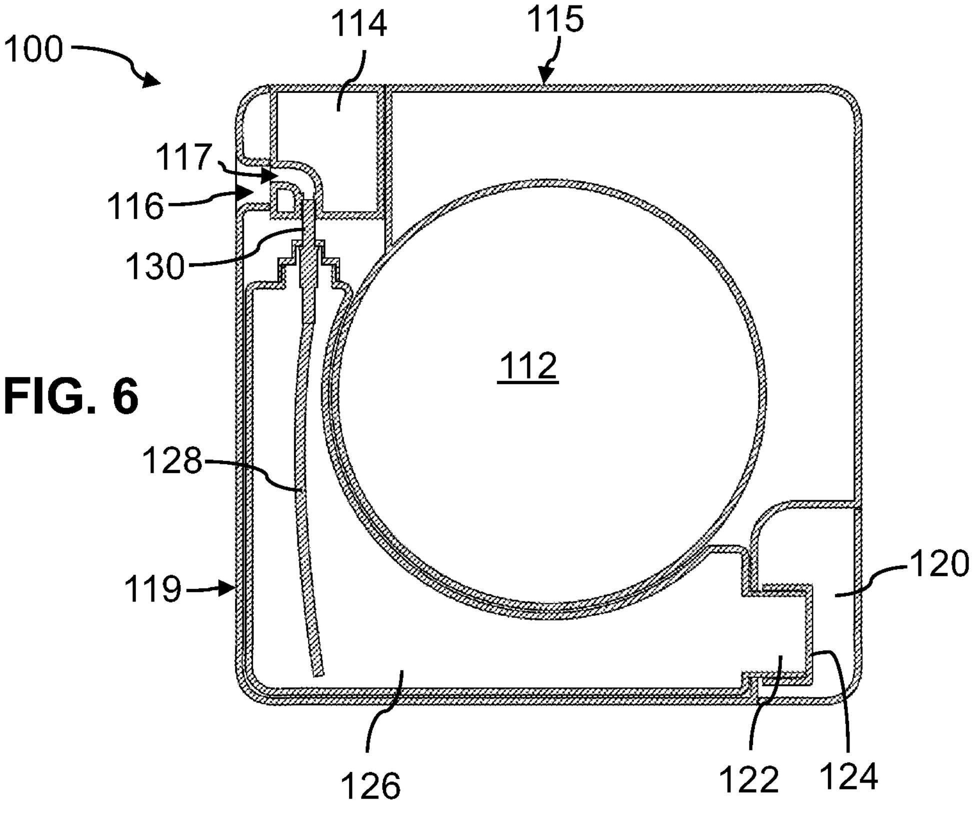
FIG. 6 is a cross-sectional side view of the wearable accessory in FIG. 1, taken along the X-X' line in FIGS. 2 and 5, with the actuator in an inactive position.

In some embodiments, as shown in FIGS. 1 and 6, the liquid container 126 comprises the mouth 122 at a first end though which a volume of liquid can be added or removed to fill or empty the liquid container. In such embodiments, the liquid container 126 further comprises the corresponding removeable cap 124, and the mouth 122 is configured to receive the removeable cap 124. The mouth 122 can be removably coupled to the removeable cap 124 using any suitable means. In this context, a suitable coupling requires a liquid-tight seal while the mouth 122 is coupled to the removeable cap 124, and further allows the user to remove and reseal the removeable cap 124 without any specialized tool. In some embodiments, for example, the mouth 122 comprises a threaded external surface that is configured to couple with a corresponding threaded internal surface of the removeable cap 124 (i.e., a screw cap). Other suitable couplings are contemplated. For example, one of skill in the art would appreciate that other suitable closures can be implemented, including, for example, snap on closures, friction fit closures, sports cap style closures, bail closures, bung type closures, etc. In some embodiments, when secured in place, the removeable cap 124 entirely obscures the visibility of the mouth 122, providing a uniform exterior for the product.

Figure 7:
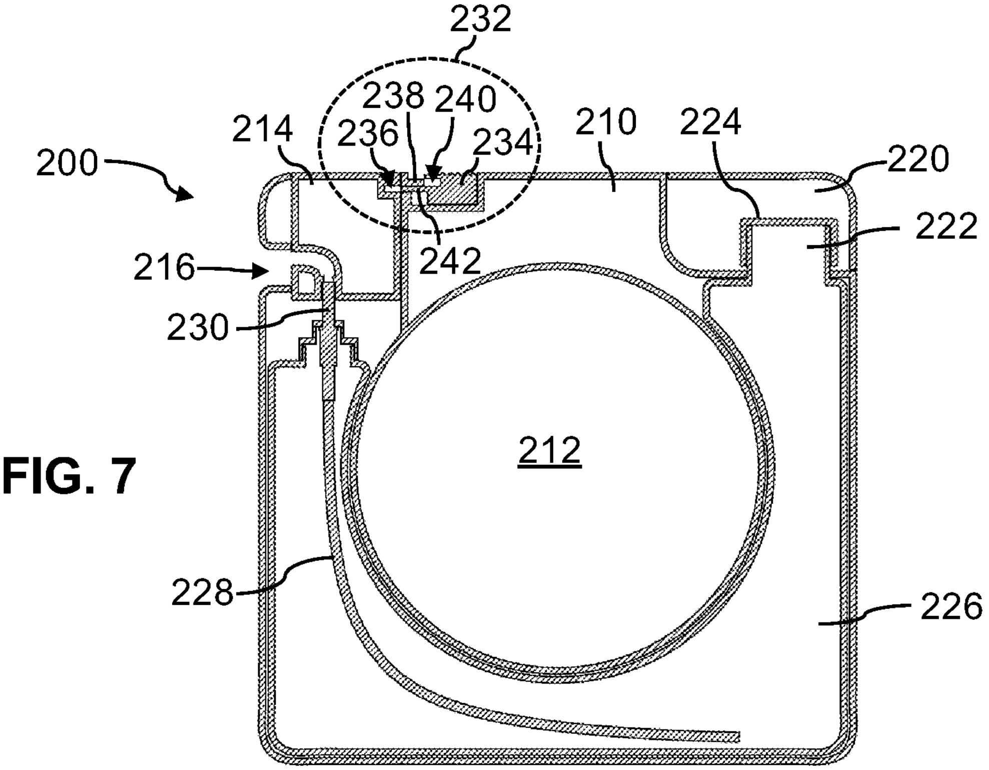
FIG. 7 is a cross-sectional view of a wearable accessory having a locking mechanism and an alternative integrated spray bottle and cap cover placement, in accordance with some embodiments described herein.

In various embodiments, other configurations of an integrated liquid container are contemplated. In the embodiment shown in FIG. 7, for example, the liquid container 226 corresponds to the internal size, shape, and profile of the housing 210. In such embodiments, the liquid container 226 comprises a general U-shape that extends along three perimeter edges of the housing 210 and the internal edge defined by the circumference of the through-hole 212. In some embodiments, as shown in FIGS. 1 and 7, the liquid container 226 comprises the mouth 222 at a first end though which a volume of liquid can be added or removed to fill or empty the liquid container. In such embodiments, the liquid container 226 comprises the corresponding removeable cap 224, and the mouth 222 is configured to receive the removeable cap 224. The mouth 222 can be removably coupled to the removeable cap 224 using any suitable means. In this context, a suitable coupling requires a liquid-tight seal while the mouth 222 is coupled to the removeable cap 224, and further allows the user to remove and reseal the removeable cap 224 without any specialized tool. In some embodiments, for example, the mouth 222 comprises a threaded external surface that is configured to couple with a corresponding threaded internal surface of the removeable cap 224 (i.e., a screw cap). Other suitable couplings are contemplated. For example, one of skill in the art would appreciate that other suitable closures can be implemented, including, for example, snap on closures, friction fit closures, sports cap style closures, bail closures, bung type closures, etc. In some embodiments, when secured in place, the removeable cap 224 obscures entirely the mouth 222, providing a uniform exterior for the product.

Figure 8:
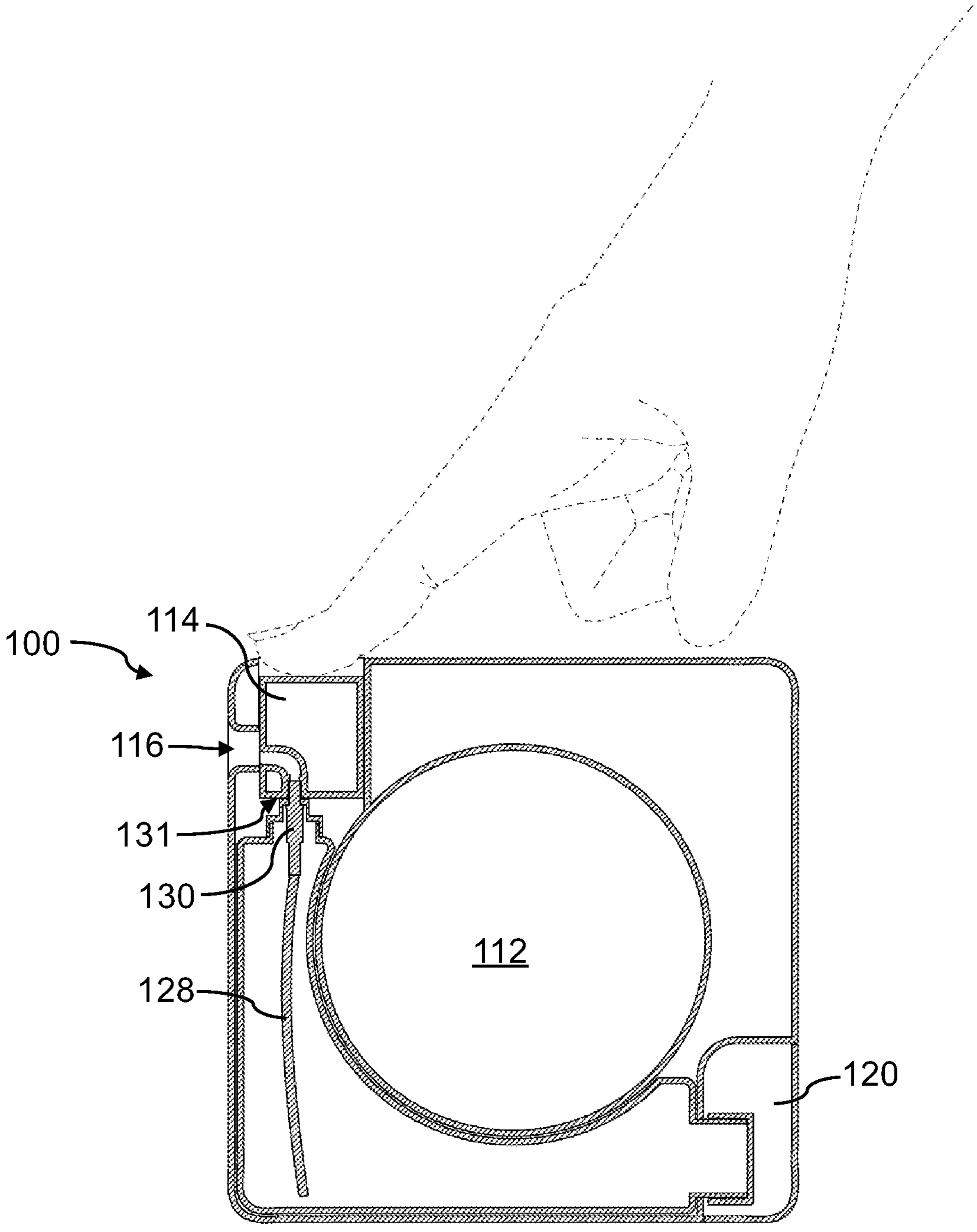
FIG. 8 is a cross-sectional side view of the wearable accessory in FIG. 6, with the actuator in an active position, and showing a user activating the actuator for environmental context.
Figure 9:
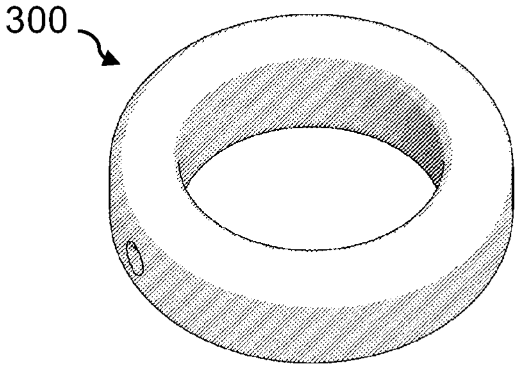
FIG. 9 is a perspective view of a wearable accessory having an alternative shape, in accordance with some embodiments described herein.
Figure 10:
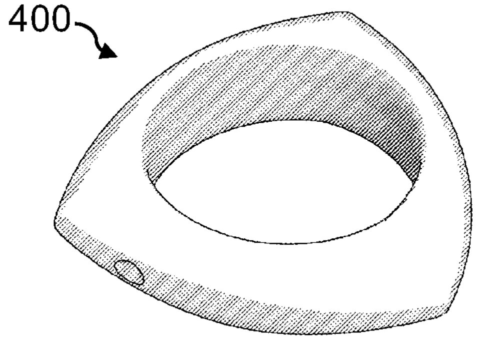
FIG. 10 is a perspective view of a wearable accessory having an alternative shape, in accordance with some embodiments described herein.
Figure 11:
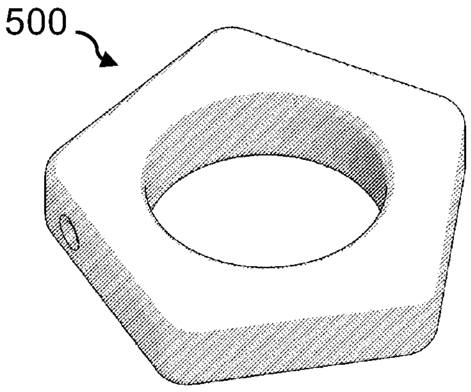
FIG. 11 is a perspective view of a wearable accessory having an alternative shape, in accordance with some embodiments described herein.
Figure 12:
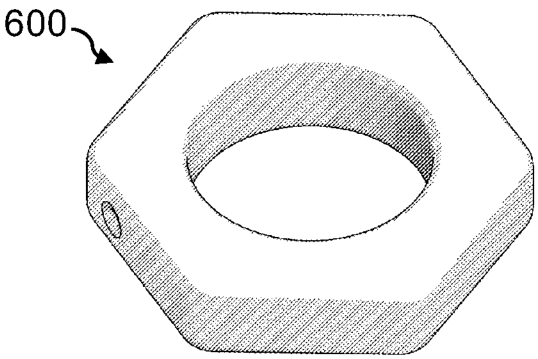
FIG. 12 is a perspective view of a wearable accessory having an alternative shape, in accordance with some embodiments described herein.

In some embodiments, the accessory 100 comprises the actuator 114. In some embodiments, as shown in FIGS. 2-6, 8, and 13, the actuator 114 comprises a solid three dimensional generally block-like structure having an outward facing surface that is accessible to the user via the top surface 115 of the accessory 100. In such embodiments, the outward facing surface of the actuator 114 is sized and shaped as a push button that is capable of being pressed inward by a user's finger, as illustrated in FIG. 8. In some embodiments, the actuator 114 comprises an upper portion comprising the outward facing surface, a central portion, and a lower portion having inward facing surface opposition the outward facing surface. In some embodiments, the actuator 114 the lower portion comprises the channel 117 for receiving the spraying mechanism 130 projecting out from a second end of the liquid container 126. In some embodiments, the spraying mechanism 130 is coupled to the dip tube 128, which is an elongated tubular structure configured to draw liquid out of the liquid container 126. The dip tube 128 can be any suitable length, whereby the suitability is based on the ability of the spraying mechanism 130 to draw liquid out of the liquid container 126 through the dip tube 128. In some embodiments, the channel 117 extends within the actuator 114 from an opening in the bottom, inward facing surface of the actuator 114 (i.e., the internal surface facing the liquid container 126) to an adjacent side surface facing the nozzle opening 116, which is formed on the surface 119 of the front side the accessory 100. In some embodiments, as shown in FIG. 6, for example, the spraying mechanism 130 projects outward and upward from the liquid container 126 toward and into the channel 117 in the actuator 114. In such embodiments, the channel 117 extends from the bottom side to an adjacent side of the actuator 114. During use, the channel 117 is in proximity to the nozzle opening 116.

In some embodiments, as shown in FIGS. 1, 2, 6-8, and 13, for example, the nozzle opening 116 is recessed within the front surface/side of the accessory 100. In such embodiments, the recessed structure of the nozzle opening 116 prevents any direct contact between a user or object and the spraying mechanism 130. In such embodiments, the components of the spraying mechanism 130 are protected from being contacted and/or contaminated by a user or object. In such embodiments, the recessed structure of the nozzle opening 116 prevents the spraying mechanism 130 from catching or being entangled with, and potentially damaging, an item of object such as clothing, bags, keys, phones, etc.

In some embodiments, as depicted in FIGS. 6 and 8, when the user depresses the actuator 114 with a finger, the actuator 114 slidably moves within the internal structure of the accessory 100. In such embodiments, the bottom inward facing surface of the actuator 114 contacts the external surface 131 of the spraying mechanism 130. In some embodiments, depressing the actuator 114 causes an increase of the pressure in the spray mechanism 130, and the pressure can then be dissipated by releasing an atomized spray of the liquid through the nozzle opening 116. In this context, an "atomized spray" or "atomization" refers to reducing the liquid to minute particles or to a fine spray. The spraying mechanism 130 can be any suitable liquid and/or mist sprayer. In some embodiments, the spraying mechanism 130 is a mist sprayer comprising a housing, housing cap, piston, spring, stem, seal, gasket, etc. In such embodiments, the mist sprayer can be coupled to the liquid container 126 and the dip tube 128. One skilled in the art would appreciate that during use, the user depresses the actuator 114 downward, as shown in FIG. 8, which causes liquid contained in the liquid container 126 to be drawn through the dip tube 128 to the interior of the sprayer housing. Subsequent actuation will pump the liquid upward through the piston toward the actuator 114 and then exit out of the nozzle opening 116. One skilled in the art would appreciate that alternative mechanisms for producing an atomized spray may be implemented in the accessory 100 without departing from the scope of this disclosure.

In some embodiments, the accessory comprises a locking mechanism. For example, as shown in FIG. 7, the accessory 200 comprises the locking mechanism 232, which is integrated into the housing 210 and the actuator 214. In such embodiments, the locking mechanism 232 comprises the slidable lock 234 integrated into the housing 210, which is further configured with the impression 240 and the projection 242. In such embodiments, the housing 210 comprises the projection 238 and the actuator 214 comprises the impression 236. During use, when a user is locking the locking mechanism 232, the projection 242 slides into the impression 236 of the actuator 214 while the projection 238 simultaneously slides into the impression 240. After actuation of the locking mechanism 232, the projection 242 inserted into the impression 236 will prevent the actuator 214 from being depressed downward to actuate the spraying mechanism 230. In such embodiments, the locking mechanism 232 prevents the accessory 200 from spraying liquid, either intentionally or unintentionally.

In some embodiments, the accessory 100 comprises a light (e.g., LED light). In some embodiments, the light may be incorporated into the housing 110. In such embodiments, the accessory 100 may include a battery for powering the light, and the housing 110 would be configured to accommodate the light and battery. In such embodiments, the light would be readily usable by the user to assist in the unlocking of a door or other tasks at night or in low light environments.

The wearable accessory can comprise any suitable shape and overall profile. Suitable shapes include, for example, the wearable accessory shown in FIGS. 9-12. In some embodiments, the wearable accessory comprises a circular shape, such as the accessory 300 in FIG. 9. In some embodiments, the wearable accessory comprises a substantially triangular shape, such as the accessory 400 in FIG. 10. In some embodiments, the wearable accessory comprises a substantially pentagonal shape, such as the accessory 500 in FIG. 11. In some embodiments, the wearable accessory comprises a substantially hexagonal shape, such as the accessory 600 in FIG. 12. One skilled in the art would appreciate that the accessories 300, 400, 500, and 600 can be configured with the same components as the accessories 100 or 200.

In various embodiments, the liquid container 126 is configured to hold and dispense any suitable sprayable liquid. In such embodiments, the liquid container 126 is fillable and refillable with the sprayable liquid. In some embodiments, for example, the accessory 100 can be used to spray liquid sanitizing solution (e.g., anti-bacterial solution), such as solutions comprising alcohol, benzalkonium chloride, etc., to prevent the spread of communicable diseases and otherwise improve personal hygiene. In some embodiments, the liquid container 126 is configured to hold sprayable liquids, including, for example, perfume or fragrances, insect (e.g., mosquito) repellent, pepper spray, sunscreen, medicine, etc.

During use, the accessory may be used to spray surfaces, such as those the user may encounter (e.g., door handles, steering wheel, faucets, elevator buttons). Alternatively, the accessory may be used to spray the user's hands, neck, wrists, ankles, or other exposed skin, clothing, etc., depending on the liquid contained. The accessory 100 may be used while being worn by the user without disassembly or modification, as shown in FIG. 13, or it can be removed from the user before dispersing the liquid contained therein.

In various embodiments, the wearable accessory 100/200/300/400/500/600 is an article of apparel, such as a piece of fashionable unisex jewelry, including, for example a bracelet, which includes a discretely integrated spray bottle. Although some embodiments herein are depicted as a bracelet, one skilled in the art would appreciate that the wearable accessory can be reconfigured into other jewelry devices, such as anklets, wristbands, wristwatches, necklaces, pendants, etc.

The components (e.g., housing, liquid container) of the wearable accessory described herein can be independently comprised of any suitable material. In some embodiments, for example, one or more components of the wearable accessory is comprised of one or more plastic compositions. In such embodiments, the composition can comprise a phenolic, polycarbonate, polypropylene, acrylic, Bakelite, celluloid, or Lucite, component. In some embodiments, for example, one or more components of the wearable accessory is comprised of one or more milled or cast metal or metal alloys. In some embodiments, one or more components of the wearable accessory is comprised of wood, metal, metal alloy, glass, stone, gem, etc. In some embodiments, the wearable accessory is comprised of a single, unitary piece of material. In other embodiments, the wearable accessory is comprised of a plurality of pieces that are assembled to form a unitary device.

Exemplary embodiments of the wearable accessory are described above in detail. The wearable accessory is not limited to the specific embodiments described herein, but rather, components of the wearable accessory may be utilized independently and separately from other components described herein. For example, the wearable accessory may also be used in combination with other devices.

Although specific features of the present embodiments may be shown in some drawings and not in others, this is for convenience only. In accordance with the principles of the disclosure, any feature of a drawing may be referenced and/or claimed in combination with any feature of any other drawing.

This written description uses examples to disclose the present embodiments, including the best mode, and also to enable any person skilled in the art to practice the present embodiments, including making and using the wearable accessory. The patentable scope of the present embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A wearable accessory for storing and dispensing liquid, comprising:

a wearable housing comprising a through-hole configured to receive a hand of a user therethrough, the through-hole being sized for the user's lower arm; and a liquid container having a structure independent from the wearable housing, and enclosed within an internal space defined by the wearable housing, the liquid container comprising a first end having a sealable opening for adding liquid for the storing and dispensing, and a second end in fluid communication with an outlet nozzle configured to receive and dispense a volume of liquid from the liquid container;

a closure configured to seal the sealable opening; and a cap cover having a structure adapted for the wearable housing and configured to cover the closure when the cap cover is in a closed position.

2. The wearable accessory of claim 1, wherein the cap cover is attached to the housing.

3. The wearable accessory of claim 1, wherein the closure is a removable cap, and the sealable opening on the first end of the liquid container is configured to be coupled to the removable cap.

4. The wearable accessory of claim 1, whereby the liquid container is immobilized within the housing due to its positioning between a plurality of perimeter edges on the housing and the through-hole.

5. The wearable accessory of claim 1, wherein the through-hole comprises a generally cylindrical shape having a circumference ranging from about 5.5 to about 10 inches.

6. The wearable accessory of claim 1, wherein the through-hole comprises a generally cylindrical shape having a circumference ranging from about 7 to about 9 inches.

7. The wearable accessory of claim 1, further comprising a lock integrated into the housing, wherein the lock is slidable from a locked position to an unlocked position.

8. A method of applying a fragrance to a surface, comprising:

providing a wearable accessory for storing and dispensing a fragrance containing liquid, the accessory comprising:

a wearable housing comprising a through-hole configured to receive a hand of a user therethrough, the through-hole being sized for the user's lower arm; and a liquid container having a structure independent from the wearable housing, and enclosed within an internal space defined by the wearable housing, the liquid container comprising a first end having a sealable opening for adding liquid for the storing and dispensing, and a second end in fluid communication with an outlet nozzle configured to receive and dispense a volume of liquid from the liquid container;

a closure configured to seal the sealable opening; and a cap cover having a structure adapted for the wearable housing and configured to cover the closure when the cap cover is in a closed position;

wherein the liquid container is filled with a volume of the fragrance containing liquid; and actuating an actuator of the wearable accessory, whereby the actuating causes liquid inside of the liquid container to be drawn to the outlet nozzle.

9. The method of claim 8, wherein the cap cover is attached to the housing.

10. The method of claim 8, wherein the closure is a removable cap, and the sealable opening on the first end of the liquid container is configured to be coupled to the removable cap.

11. The method of claim 8, whereby the liquid container is immobilized within the housing due to its positioning between a plurality of perimeter edges on the housing and the through-hole.

12. The method of claim 8, wherein the surface is human skin.

13. A method of sanitizing a surface, comprising:

providing a wearable accessory for storing and dispensing sanitizing liquid, the accessory comprising:

a wearable housing comprising a through-hole configured to receive a hand of a user therethrough, the through-hole being sized for the user's lower arm; and a liquid container having a structure independent from the wearable housing, and enclosed within an internal space defined by the wearable housing, the liquid container comprising a first end having a sealable opening for adding liquid for the storing and dispensing, and a second end in fluid communication with an outlet nozzle configured to receive and dispense a volume of liquid from the liquid container;

a closure configured to seal the sealable opening; and a cap cover having a structure adapted for the wearable housing and configured to cover the closure when the cap cover is in a closed position;

wherein the liquid container is filled with a volume of the sanitizing liquid; and actuating an actuator of the wearable accessory, whereby the actuating causes liquid inside of the liquid container to be drawn to the outlet nozzle.

14. The method of claim 13, wherein the cap cover is removably attached to the housing.

15. The method of claim 13, wherein the closure is a removable cap, and the sealable opening on the first end of the liquid container is configured to be coupled to the removable cap.

16. The method of claim 13, whereby the liquid container is immobilized within the housing due to its positioning between a plurality of perimeter edges on the housing and the through-hole.

17. The method of claim 13, wherein the surface is human skin.

* * * * *